Dec. 5, 1933.  H. G. TAYLOR  1,938,056
METHOD OF MAKING CHAIN LINKS
Original Filed May 2, 1931

Humphrey George Taylor,
Inventor.
by Lester & Sargent,
Attorney.

Patented Dec. 5, 1933

1,938,056

UNITED STATES PATENT OFFICE 1,938,056

METHOD OF MAKING CHAIN LINKS

Humphrey George Taylor, Penn, near Wolverhampton, England

Original application May 2, 1931, Serial No. 534,632, and in Great Britain May 13, 1930. Divided and this application January 10, 1933. Serial No. 651,023

2 Claims. (Cl. 59—35)

The invention relates to the production of chain links of the type consisting of two U-shaped end members and a transverse stud, one end being joined to the other by butt arc welding, that is by passing a heavy electric current therethrough, and has for its object to make provision for a transverse stud in a very convenient and efficient manner.

Heretofore, in a welded link having a transverse stud, the latter has sometimes been separately welded in; but this is expensive and cannot be performed by butt arc welding, as the link is already closed. In another case the stud has been formed by wrapping one part of the link over the other; but, in this case also, the process of butt arc welding cannot be utilized.

The invention consists in first forming the link in two parts each consisting of a loop with a shorter and a longer leg each longer leg having an inward projection forming a part of a stud which is divided transversely of its length, then presenting the shorter leg of the one loop to the longer leg of the other loop while the inner ends of each stud part abut, and finally causing the adjacent ends of the legs to be permanently joined together by flash butt welding.

The invention is described with reference to the drawing herewith of which:—

Figures 1, 2:
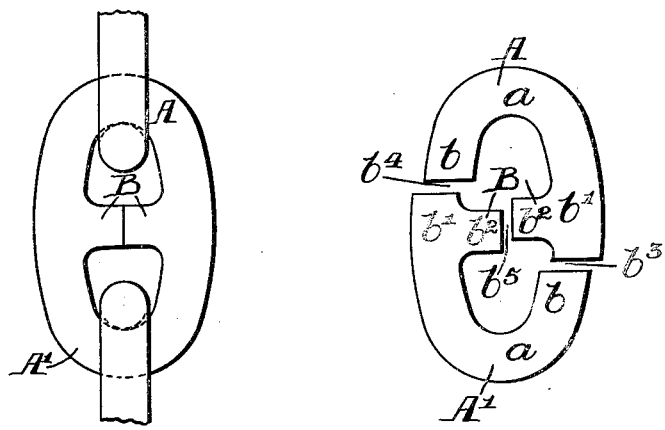
Figure 1 is a face view of the link in its complete form.
Figure 2 is a view of the two separate parts of the link before they are welded together.

In the drawing, B is the stud and A, A' are the two end portions of the link, each portion comprising a loop $a$ with a shorter leg $b$ and a longer leg $b'$. Each longer leg $b'$ has an inward projection forming a half $b^2$ of the stud which is divided transversely of its length. The adjacent links are next inserted in the link halves and then the two halves are presented to each other with the short leg $b$ of the one to the longer leg $b'$ of the other and finally these are permanently joined together at $b^3$ $b^4$ by flash butt welding.

It is not necessary to weld the adjacent ends of the stud together at $b^5$ as the stud is not exposed to any tensional stress but has only to take compression stress in use.

The adjacent links of the chain may be formed as plain stampings each with the ends and stud in one piece. It is only necessary that alternate links be made according to this invention.

Having fully described my invention what I claim and desire to secure by Letters Patent is:—

1. A method of forming a chain link having two end portions of U-shape and a transverse stud, said method consisting in first forming the link in two parts each consisting of a loop with a shorter and a longer leg, each longer leg having an inward projection forming a part of a stud, then presenting the shorter leg of the one loop to the longer leg of the other loop while the inner ends of the stud parts abut, and finally causing the adjacent ends of the legs to be permanently joined together by flash welding.

2. A method of forming a chain link having two end portions of U-shape and a transverse stud, said method consisting in first forming the link in two parts each consisting of a loop with a shorter and a longer leg, each longer leg having an inward projection forming a part of a stud, then presenting the shorter leg of the one loop to the longer leg of the other loop while the inner ends of the stud parts abut, and finally causing the adjacent ends of the legs to be permanently joined together by electrically welding same.

HUMPHREY GEORGE TAYLOR.